(12) United States Patent
Park et al.

(10) Patent No.: US 11,815,179 B2
(45) Date of Patent: Nov. 14, 2023

(54) ACTUATOR FOR TRANSMISSION

(71) Applicants: Hyundai Motor Company, Seoul (KR); Kia Motors Corporation, Seoul (KR)

(72) Inventors: Jong Yun Park, Hwaseong-Si (KR); Sung Wha Hong, Hwaseong-Si (KR); Hang Chul Cho, Hwaseong-Si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 51 days.

(21) Appl. No.: 16/918,866

(22) Filed: Jul. 1, 2020

(65) Prior Publication Data

US 2021/0239209 A1 Aug. 5, 2021

(30) Foreign Application Priority Data

Feb. 5, 2020 (KR) ........................ 10-2020-0013453

(51) Int. Cl.
  *F16H 63/30* (2006.01)
  *F16H 63/06* (2006.01)
  *F16H 63/32* (2006.01)
  *F16H 25/22* (2006.01)
  *F16H 25/20* (2006.01)

(52) U.S. Cl.
  CPC ....... *F16H 63/304* (2013.01); *F16H 25/2204* (2013.01); *F16H 63/062* (2013.01); *F16H 63/32* (2013.01); *F16H 2025/204* (2013.01); *F16H 2063/3063* (2013.01)

(58) Field of Classification Search
  CPC .. F16H 63/304; F16H 25/2204; F16H 63/062; F16H 63/32; F16H 2063/3063
  See application file for complete search history.

(56) References Cited

U.S. PATENT DOCUMENTS

| | | | | |
|---|---|---|---|---|
| 4,449,416 | A * | 5/1984 | Huitema | F16H 63/304 74/DIG. 7 |
| 5,094,121 | A * | 3/1992 | von Kaler | G05G 5/065 74/473.27 |
| 5,205,179 | A * | 4/1993 | Schneider | F16H 63/304 74/424.89 |
| 7,581,462 | B2 * | 9/2009 | Shintani | F16H 63/20 74/335 |
| 8,960,041 | B2 * | 2/2015 | Buhrke | F16H 63/32 74/473.36 |
| 2002/0139215 | A1 * | 10/2002 | Smith | F16H 63/32 74/473.37 |
| 2007/0209461 | A1 * | 9/2007 | Baldwin | F16H 63/18 74/335 |

(Continued)

FOREIGN PATENT DOCUMENTS

| | | | | |
|---|---|---|---|---|
| KR | 10-2017-0052790 A | | 5/2017 | |
| WO | WO-2015027053 A1 | * | 2/2015 | ........... B60K 17/344 |
| WO | WO 2018085345 | * | 11/2017 | ............. F16H 63/20 |

*Primary Examiner* — Zakaria Elahmadi
(74) *Attorney, Agent, or Firm* — MORGAN, LEWIS & BOCKIUS LLP

(57) ABSTRACT

An actuator for a transmission may include a shift fork coupled to a sleeve; a ball screw mounted to pass through a portion of the shift fork; and at least a guide shaft mounted to pass through a portion of the shift fork to be parallel to the ball screw.

7 Claims, 5 Drawing Sheets

(56) References Cited

U.S. PATENT DOCUMENTS

2009/0038423 A1* 2/2009 Shintani ................ F16H 63/22
  74/335
2010/0229668 A1* 9/2010 Smith .................... F16H 63/30
  74/473.11
2018/0135751 A1* 5/2018 Maki ...................... F16D 23/12

* cited by examiner

ACTUATOR FOR TRANSMISSION

CROSS REFERENCE TO RELATED APPLICATION

The present application claims priority to Korean Patent Application No. 10-2020-0013453, filed on Feb. 5, 2020, the entire contents of which is incorporated herein for all purposes by this reference.

BACKGROUND OF THE INVENTION

Field of the Invention

The present invention relates to an actuator for a transmission, and more particularly, to a structure of an actuator used for a transmission mounted on a vehicle.

Description of Related Art

A plurality of clutches may be used for a transmission of a vehicle to control power transmission between rotating bodies rotating relative to each other.

As a type of the clutch used for the transmission as described above, there is a synchronizing device switching the rotating bodies from a state of the power transmission to a state of no power transmission and vice versa using a sleeve moved in an axial direction thereof.

The synchronizing device may require an actuator to move the sleeve in the axial direction thereof to be engaged with a clutch gear.

Meanwhile, it is also possible to configure a clutch which is similar to the synchronizing device in moving the sleeve in the axial direction thereof and different from the synchronizing device in continuously varying friction force between the two rotating bodies. Even in the instant case, the actuator may be needed to properly press the sleeve in the axial direction thereof.

The information included in this Background of the present invention section is only for enhancement of understanding of the general background of the present invention and may not be taken as an acknowledgement or any form of suggestion that this information forms the prior art already known to a person skilled in the art.

BRIEF SUMMARY

Various aspects of the present invention are directed to providing an actuator for a transmission improving durability of the transmission and ensuring smooth shift feeling of the transmission by ensuring the actuator, which may switch a power transmission state of rotating bodies by moving a sleeve in an axial direction or vary friction force between the rotating bodies, to be operated more efficiently and reliably and to be controlled more precisely, improving shift operation and shift quality of the transmission.

According to an exemplary embodiment of the present invention, an actuator for a transmission includes: a shift fork coupled to a sleeve; a ball screw mounted to pass through a portion of the shift fork; and at least a guide shaft mounted to pass through a portion of the shift fork to be parallel to the ball screw.

The ball screw may be fastened to pass through an upper center portion of the shift fork; and the guide shafts may be mounted to pass through both lower sides of the portion of the shift fork through which the ball screw passes.

The guide shafts may be mounted symmetrically on both sides of the ball screw to form an isosceles triangle having the ball screw as a vertex.

The shift fork may be integrally formed with an extension portion through which the guide shaft passes, the extension portion being formed above the portion through which the ball screw passes; and the guide shaft may be mounted to pass through the extension portion to be parallel to and above the ball screw.

The shift fork may have a guide hole through which the guide shaft passes below the portion through which the ball screw passes; and the guide shaft may be mounted to pass through the guide hole to be parallel to and below the ball screw.

The shift fork may have the portions through which the ball screw and the guide shaft pass formed to be thicker than a portion to which the sleeve is coupled in the axial direction thereof.

A motor rotating the ball screw may be directly connected to an end portion of the ball screw.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
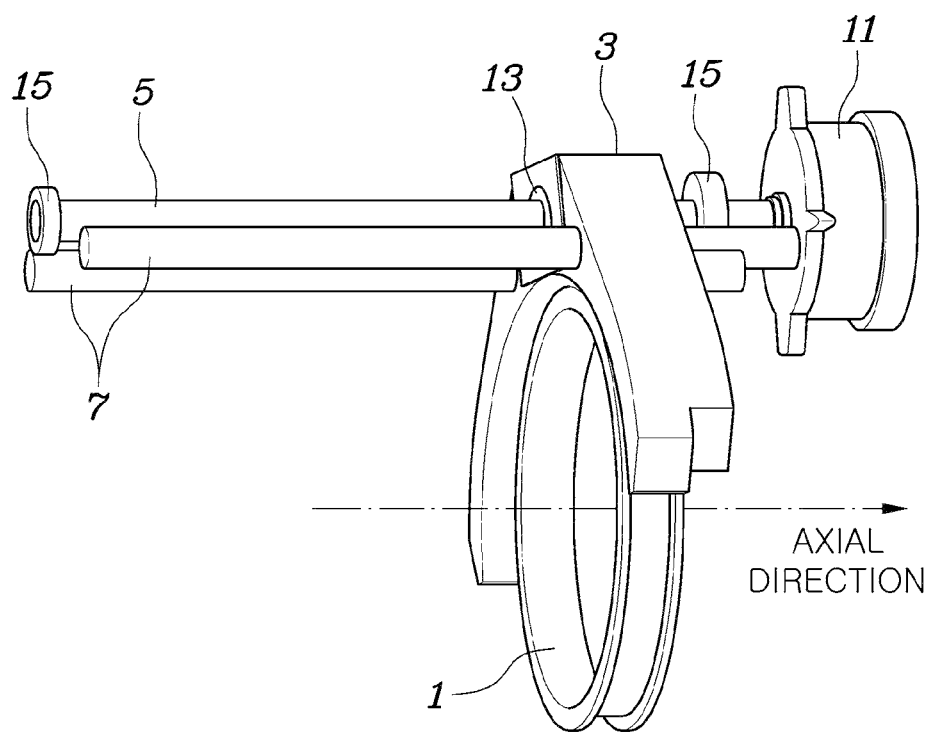
FIG. 1 is a view showing various exemplary embodiments of an actuator for a transmission according to an exemplary embodiment of the present invention.

It may be understood that the appended drawings are not necessarily to scale, presenting a somewhat simplified representation of various features illustrative of the basic principles of the present invention. The specific design features of the present invention as included herein, including, for example, specific dimensions, orientations, locations, and shapes will be determined in part by the particularly intended application and use environment.

In the figures, reference numbers refer to the same or equivalent portions of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

Referring to FIG. 1, FIG. 2, FIG. 3, and FIG. 4, actuators for a transmission according to all embodiments of the present invention commonly include: a shift fork 3 coupled to a sleeve 1; a ball screw 5 mounted to pass through the shift fork 3; and a guide shaft 7 mounted to pass through the shift fork 3 to be parallel to the ball screw 5.

That is, the present invention may enable a smooth and precise linear sliding of the shift fork 3 by allowing the shift fork 3, which is provided to move the sleeve 1 in the axial direction thereof, to be driven by the ball screw 5 and by allowing the guide shaft 7 to guide the present linear sliding of the shift fork 3.

Figure 5:
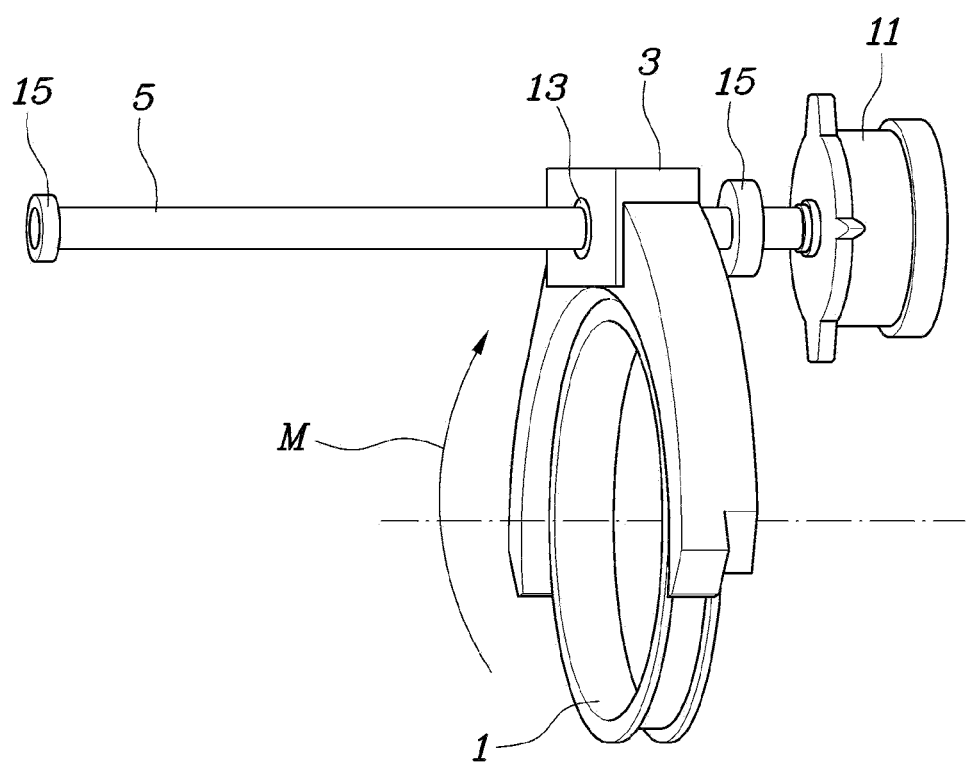
FIG. 5 is a view showing a problem in a case where a guide shaft of the present invention is not used.

As shown in FIG. 5, in a case where the guide shaft 7 as described above is not provided, when the sleeve 1 is to be moved in the axial direction thereof, a rotation moment M may occur around a portion of the shift fork 3 connected to the ball screw 5 by reaction force acting on the sleeve 1 in the axial direction thereof. As a result, a pinching between the ball screw 5 and the shift fork 3 may occur due to an eccentric load therebetween, and excessive friction force may occur between the ball screw 5 and the shift fork 3. Therefore, it may prevent the sliding of the shift fork 3 driven by the ball screw 5 from being smoothly worked.

If the shift fork 3 is not smoothly moved by the above phenomenon or moved with poor control precision, the actuator may have lower efficiency and the transmission may have not only lower transmission quality but also lower durability.

In view of the above, the present invention may include the guide shaft 7 formed to be parallel to the ball screw 5 to guide the linear sliding of the shift fork 3 as described above. The present configuration may prevent the pinching between the shift fork 3 and the ball screw 5 even though the rotation moment M caused from the sleeve 1 acts on the shift fork 3, always facilitating easy, smooth and accurate driving of the shift fork 3.

Figure 2:
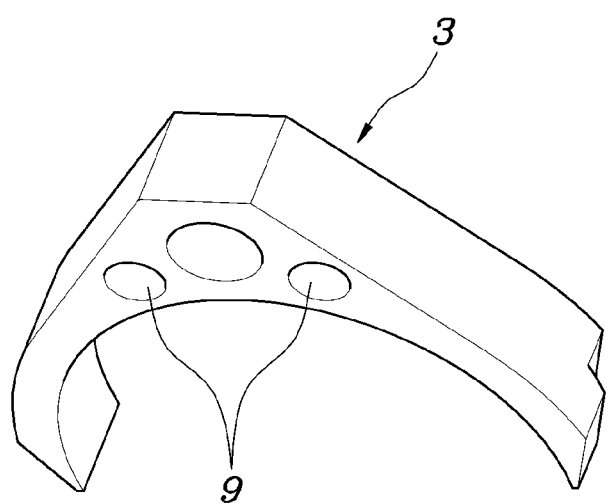
FIG. 2 is a view showing a shift fork of FIG. 1.

As shown in various exemplary embodiments of FIG. 1 and FIG. 2, the ball screw 5 may be fastened to pass through an upper center portion of the shift fork 3; and the guide shafts 7 may be mounted to pass through guide holes 9 at both lower sides of the above portion of the shift fork 3 through which the ball screw 5 passes.

That is, the guide shafts 7 may be mounted symmetrically on both sides of the ball screw 5 to form an isosceles triangle having the ball screw 5 as a vertex.

Both end portions of the guide shafts 7 may preferably be fixed to a transmission housing, and the motor 11 rotating the ball screw 5 may be directly connected to an end portion of the ball screw 5. Therefore, in a case where the controller drives the motor 11, the ball screw 5 may be rotated to drive the shift fork 3 to linearly slide in the axial direction thereof.

The present configuration may allow the two guide shafts 7 on both the sides of the ball screw 5 to guide the linear sliding of the shift fork 3 together. Therefore, the rotation moment M acting on the shift fork 3 may be easily disabled, effectively preventing the pinching between the ball screw 5 and the shift fork 3.

For reference, the ball screw 5 may be fastened to a ball nut 13 integrally formed on the shift fork 3, and thus the pinching may occur between the ball screw 5 and the ball nut 13 substantially. However, the ball nut 13 is integrally formed on the shift fork 3 and the shift fork 3 may itself have a function of the ball nut 13. The present invention thus describes that the pinching may occur between the ball screw 5 and the shift fork 3.

Bearings 15 may be mounted at both end portions of the ball screw 5, and a separate bushing or the like may be inserted into each of the guide holes 9 of the shift fork 3 into which the guide shafts 7 are inserted.

Figure 3:
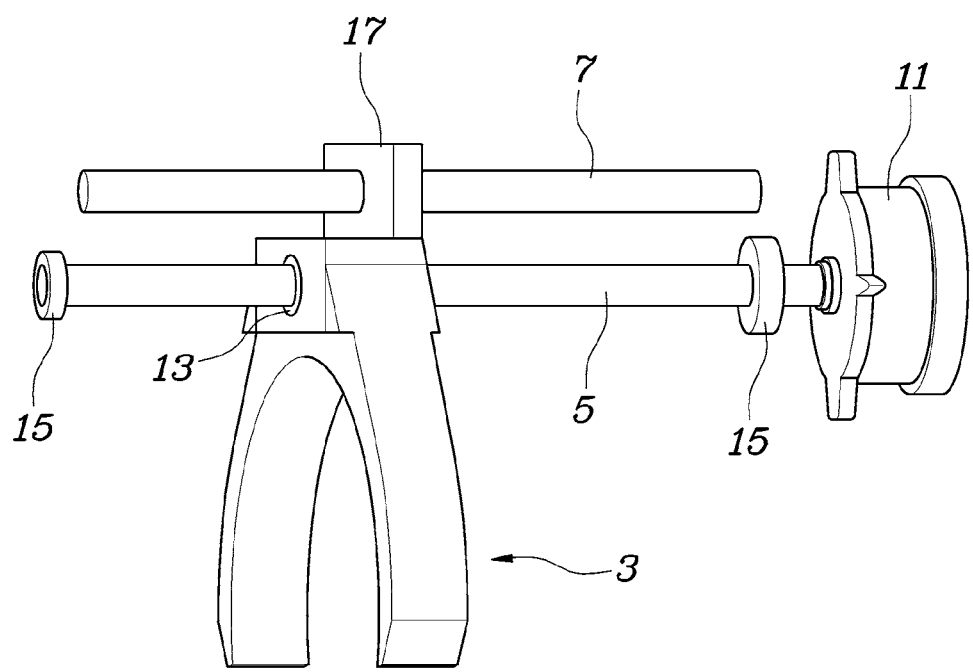
FIG. 3 is a view showing various exemplary embodiments of an actuator for a transmission according to an exemplary embodiment of the present invention.

FIG. 3 is a view showing various exemplary embodiments of an actuator for a transmission according to an exemplary embodiment of the present invention, in which the shift fork 3 may be integrally formed with an extension portion 17 through which the guide shaft 7 passes, the extension portion 17 being formed above the portion through which the ball screw 5 passes; and the guide shaft 7 may be mounted to pass through the extension portion 17 to be parallel to and above the ball screw 5.

The present configuration may be advantageous to be used for a transmission having a free space above the shift fork 3.

Figure 4:
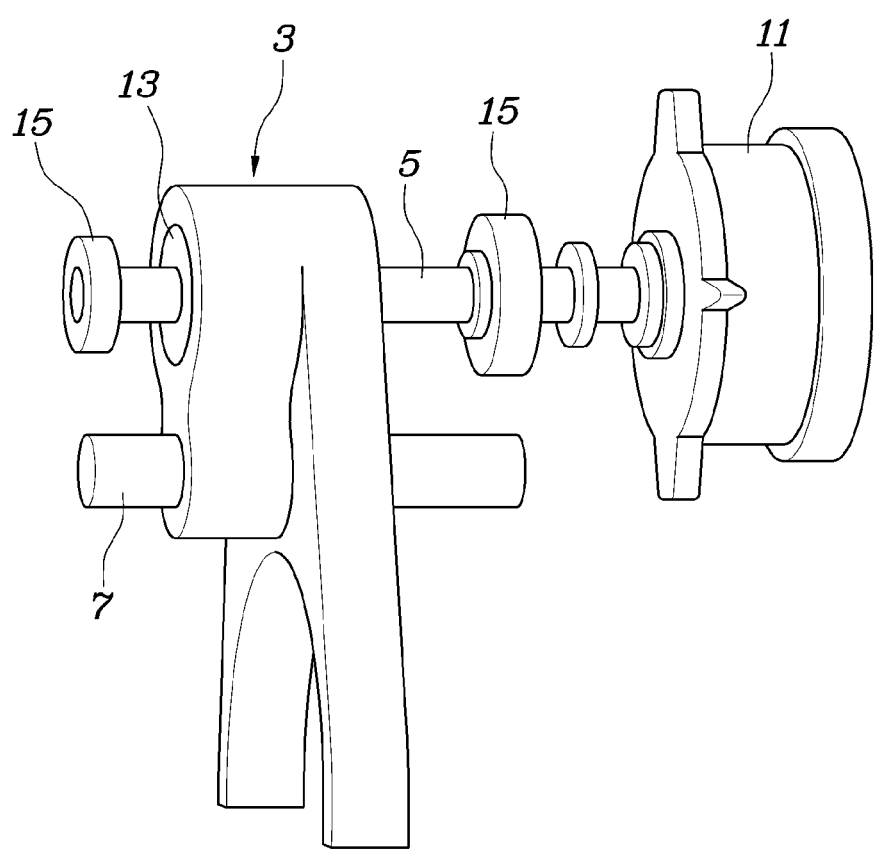
FIG. 4 is a view showing various exemplary embodiments of an actuator for a transmission according to an exemplary embodiment of the present invention.

FIG. 4 is a view showing various exemplary embodiments of an actuator for a transmission according to an exemplary embodiment of the present invention, in which the shift fork 3 may have a guide hole 9 through which the guide shaft 7 passes below the portion through which the ball screw 5 passes; and the guide shaft 7 may be mounted to pass through the guide hole 9 to be parallel to and below the ball screw 5.

The shift fork 3 may have the portions through which the ball screw 5 and the guide shaft 7 pass formed to be thicker than a portion to which the sleeve 1 is coupled in the axial direction thereof.

That is, the portion of the shift fork 3 coupled to the sleeve 1 may be formed to have a thinner thickness, and the portion into which the guide shaft 7 is inserted and the portion into which the ball screw 5 is inserted may be formed to have a thicker thickness, suppressing increase in weight of the shift fork 3 as much as possible while more securely guiding the linear sliding of the shift fork 3.

As described above, the present invention may provide the actuator for a transmission improving the durability of the transmission and ensuring the smooth shift feeling of the transmission by ensuring the actuator, which may switch the power transmission state of the rotating bodies by moving the sleeve in the axial direction or vary the friction force between the rotating bodies, to be operated more efficiently and reliably and to be controlled more precisely, improving the shift operation and shift quality of the transmission.

For convenience in explanation and accurate definition in the appended claims, the terms "upper", "lower", "inner", "outer", "up", "down", "upwards", "downwards", "front", "rear", "back", "inside", "outside", "inwardly", "outwardly", "internal", "external", "inner", "outer", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. An actuator for a transmission, the actuator comprising:
a shift fork coupled to a sleeve;
a ball screw mounted to pass through an upper center portion of the shift fork; and
at least a guide shaft mounted to pass through a predetermined portion of the shift fork,
wherein an axis of the at least a guide shaft is aligned in parallel to an axis of the ball screw,
wherein the at least a guide shaft includes first and second guide shafts mounted to respectively pass through first and second guide holes respectively formed at first and second lower sides of the upper center portion of the shift fork through which the ball screw passes,
wherein the first and second guide shafts are mounted symmetrically on the first lower side and the second lower side of the ball screw to form an isosceles triangle having the ball screw as a vertex thereof,
wherein the shift fork is integrally formed with an extension portion through which the at least a guide shaft passes, the extension portion being formed above the upper center portion through which the ball screw passes, and
wherein the at least a guide shaft is mounted to pass through the extension portion to be in parallel to and above the ball screw.

2. The actuator for the transmission of claim 1, wherein the at least a guide shaft further includes a guide shaft mounted to pass through the extension portion to be in parallel to and above the ball screw.

3. An actuator for a transmission, the actuator comprising:
a shift fork coupled to a sleeve;
a ball screw mounted to pass through an upper center portion of the shift fork; and
at least a guide shaft mounted to pass through a predetermined portion of the shift fork,
wherein an axis of the at least a guide shaft is aligned in parallel to an axis of the ball screw,
wherein the at least a guide shaft includes first and second guide shafts mounted to respectively pass through first and second guide holes respectively formed at first and second lower sides of the upper center portion of the shift fork through which the ball screw passes,
wherein the first and second guide shafts are mounted symmetrically on the first lower side and the second lower side of the ball screw to form an isosceles triangle having the ball screw as a vertex thereof,
wherein the shift fork includes at least a guide hole through which the at least a guide shaft passes at the predetermined portion, below the upper center portion through which the ball screw passes, the at least a guide hole including the first and second guide holes, and
wherein the at least a guide shaft is mounted to pass through the at least a guide hole to be in parallel to and below the ball screw.

4. The actuator for the transmission of claim 3,
wherein the shift fork includes the upper center portion and the predetermined portion through which the ball screw and the at least a guide shaft pass, respectively, and
wherein the upper center portion and the predetermined portion are formed to be thicker than a portion of the shift fork to which the sleeve is coupled, in an axial direction of the ball screw.

5. The actuator for the transmission of claim 1, wherein a motor rotating the ball screw is directly connected to an end portion of the ball screw.

6. An actuator for a transmission, the actuator comprising:
a shift fork coupled to a sleeve;
a ball screw mounted to pass through an upper center portion of the shift fork; and
at least a guide shaft mounted to pass through a predetermined portion of the shift fork,
wherein an axis of the at least a guide shaft is aligned in parallel to an axis of the ball screw,
wherein the at least a guide shaft includes first and second guide shafts mounted to respectively pass through first and second guide holes respectively formed at first and second lower sides of the upper center portion of the shift fork through which the ball screw passes,
wherein the first and second guide shafts are mounted symmetrically on the first lower side and the second lower side of the ball screw to form an isosceles triangle having the ball screw as a vertex thereof,
wherein a first bearing and a second bearing are mounted at first and second end portions of the ball screw, respectively, and
wherein the first bearing is positioned in front of the ball screw and the second bearing is positioned in rear of the ball screw in an axial direction of the ball screw.

7. The actuator for the transmission of claim 1, wherein a ball nut is integrally formed on the upper center portion of the shift fork to be engaged to the ball screw.

* * * * *